U S011914189B2

(12) United States Patent
Sugiyama (10) Patent No.: US 11,914,189 B2
(45) Date of Patent: Feb. 27, 2024

(54) OPTICAL DEVICE AND OPTICAL COMMUNICATION APPARATUS

(71) Applicant: Fujitsu Optical Components Limited, Kawasaki (JP)

(72) Inventor: Masaki Sugiyama, Kawasaki (JP)

(73) Assignee: FUJITSU OPTICAL COMPONENTS LIMITED, Kawasaki (JP)

(*) Notice: Subject to any disclaimer, the term of this patent is extended or adjusted under 35 U.S.C. 154(b) by 109 days.

(21) Appl. No.: 17/450,620

(22) Filed: Oct. 12, 2021

(65) Prior Publication Data

US 2022/0179277 A1 Jun. 9, 2022

(30) Foreign Application Priority Data

Dec. 4, 2020 (JP) .................................. 2020-201984

(51) Int. Cl.
*G02B 6/125* (2006.01)
*G02F 1/035* (2006.01)
*G02F 1/225* (2006.01)

(52) U.S. Cl.
CPC ........... *G02B 6/125* (2013.01); *G02F 1/0353* (2013.01); *G02F 1/0356* (2013.01); *G02F 1/2255* (2013.01)

(58) Field of Classification Search
CPC ..... G02B 6/125; G02F 1/0353; G02F 1/0356; G02F 1/2255; G02F 1/035
USPC ........................................................ 385/1–3
See application file for complete search history.

(56) References Cited

U.S. PATENT DOCUMENTS

| 7,212,326 | B2* | 5/2007 | Wooten ................... G02F 1/225 359/279 |
| 8,467,635 | B2* | 6/2013 | Doi ......................... G02F 1/225 385/2 |
| 2003/0128905 | A1* | 7/2003 | Kambe .................... G02F 1/225 385/14 |
| 2010/0202723 | A1* | 8/2010 | Sugiyama ............. G02F 1/2255 385/2 |
| 2014/0119686 | A1* | 5/2014 | Sugiyama ............... H04J 14/06 385/2 |

(Continued)

FOREIGN PATENT DOCUMENTS

| CN | 105865433 A | * 8/2017 | ............. G01C 19/72 |
| JP | 2014-112171 A | 6/2014 | |
| JP | 2019-015791 A | 1/2019 | |

*Primary Examiner* — Robert Tavlykaev
(74) *Attorney, Agent, or Firm* — STAAS & HALSEY LLP (57) ABSTRACT

An optical device includes a plurality of first Si waveguides that split and output an optical signal received from an input unit, plurality of LN waveguides that are included in a LN modulator and that transmit the optical signals that are split and output by the first Si waveguides, and a plurality of second Si waveguides that multiplex and output the associated optical signals that are output from the plurality of respective LN waveguides. The device includes an output unit that outputs the optical signal multiplexed by the second Si waveguides, and a plurality of Mach-Zehnder interferometers disposed on each of waveguides connected by the first Si waveguides, the LN waveguides, and the second Si waveguides, respectively. When there are differences among waveguide lengths of the LN waveguides, the device is configured such that the optical path lengths of the waveguides for the respective Mach-Zehnder interferometers are equalized.

12 Claims, 8 Drawing Sheets

(56) References Cited

U.S. PATENT DOCUMENTS

| | | | |
|---|---|---|---|
| 2014/0153934 A1* | 6/2014 | Sugiyama | G02B 6/29355 |
| | | | 385/3 |
| 2015/0078763 A1* | 3/2015 | Sugiyama | G02F 1/225 |
| | | | 385/3 |
| 2018/0329269 A1* | 11/2018 | Ward | G02F 1/2255 |
| 2019/0011800 A1 | 1/2019 | Kikuchi et al. | |
| 2019/0271896 A1* | 9/2019 | Sugiyama | G02F 1/218 |
| 2021/0302674 A1* | 9/2021 | Miyazaki | G02B 6/125 |

* cited by examiner

OPTICAL DEVICE AND OPTICAL COMMUNICATION APPARATUS

CROSS-REFERENCE TO RELATED APPLICATION

This application is based upon and claims the benefit of priority of the prior Japanese Patent Application No. 2020-201984, filed on Dec. 4, 2020, the entire contents of which are incorporated herein by reference.

FIELD

The embodiments discussed herein are related to an optical device and an optical communication apparatus.

BACKGROUND

In general, for example, an optical device, such as an optical modulator, sometimes includes an optical modulator chip in which an optical waveguide is formed on the surface of the optical modulator chip. A signal electrode is disposed on the optical waveguide that is formed on the optical modulator chip and, if a voltage is applied to the signal electrode, an electric field in a vertical direction with respect to the surface of the optical modulator chip is generated inside the optical waveguide. The refractive index of the optical waveguide varies due to the electric field; therefore, the phase of light propagating in the optical waveguide is changed and it is thus possible to modulate the light. Namely, the optical waveguide formed on the optical modulator chip constitutes, for example, a Mach-Zehnder interferometer and is able to output, for example, IQ signals that are subjected to XY polarization division multiplexing on the basis of phase differences of the light among a plurality of optical waveguides that are disposed in parallel.

If the optical modulator chip performs high-speed modulation, a high-speed signal with a band of, for example, several tens of gigahertz (GHz) is input to a signal electrode that is disposed along the optical waveguide. Consequently, a coplanar waveguide (CPW) structure that is able to obtain a wide band transmission characteristic is sometimes used for the signal electrode. Namely, a signal electrode and a pair of ground electrodes that sandwiches the signal electrode are sometimes disposed above the optical waveguide.

In contrast, the optical waveguide is sometimes formed at a position overlapping a position of the signal electrode by spreading, for example, metals, such as titanium, from the surface of a substrate. Furthermore, a LN optical waveguide using a thin film of a lithium niobate (LN) crystal is sometimes formed at the position overlapping the position of the signal electrode. The LN optical waveguide is able to confine light more strongly as compared to when a diffusion optical waveguide that diffuses metal is used, is able to improve an application efficiency of the electric field, and is able to decrease a drive voltage.

Figure 7:
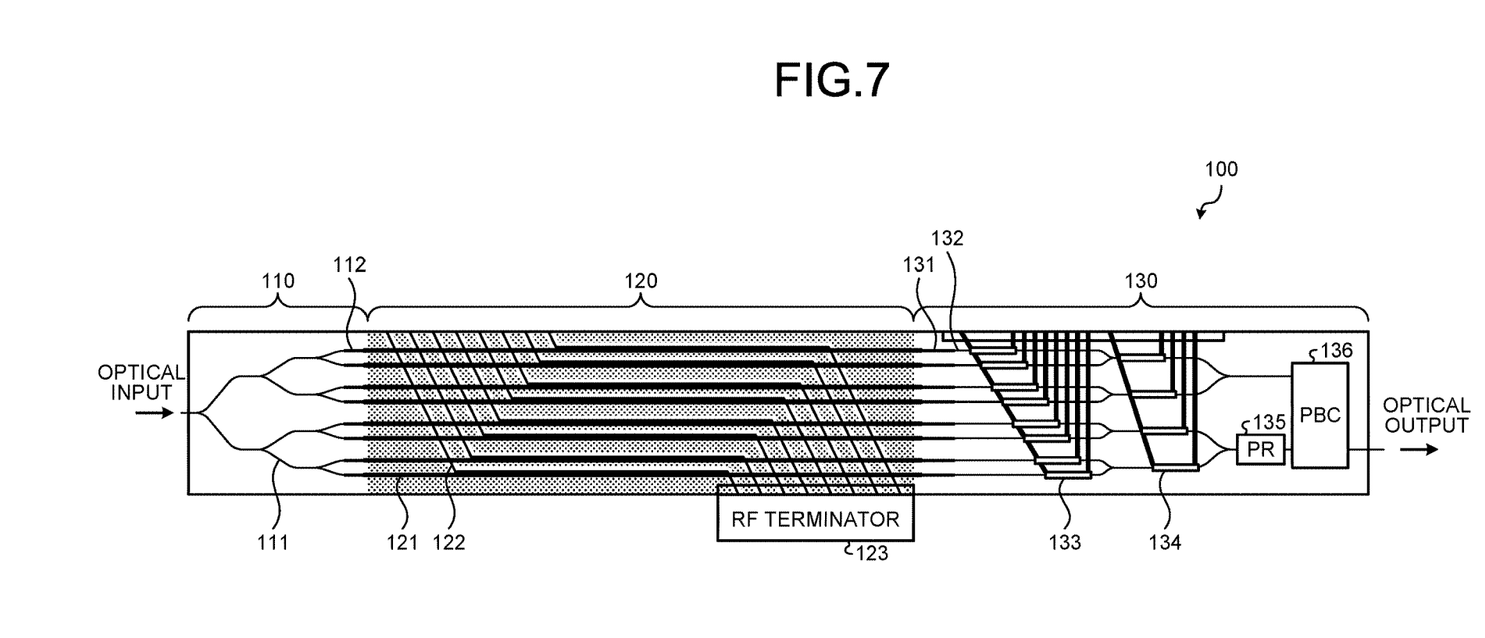
FIG. 7 is a schematic plan view illustrating an example of a configuration of an optical modulator.

FIG. 7 is a schematic plan view illustrating an example of a configuration of an optical modulator 100. The optical modulator 100 illustrated in FIG. 7 has a configuration in which an optical fiber extending from a light source is connected to an input side of the optical modulator 100 and an optical fiber that is used to output a transmission signal is connected to an output side of the optical modulator 100. The optical modulator 100 has an optical input unit 110, an LN modulating unit 120, and an optical output unit 130. The optical input unit 110 includes a first Si optical waveguide 111 and a first LN-Si waveguide joining unit 112. The first Si optical waveguide 111 has a single Si optical waveguide connected to the optical fiber on the input side, two Si optical waveguides that are branched off from the single Si optical waveguide, four Si optical waveguides that are branched off from the associated two Si optical waveguides, and eight Si optical waveguides that are branched off from the associated four Si optical waveguides. The first LN-Si waveguide joining unit 112 joins a portion between the eight Si optical waveguides included in the first Si optical waveguide 111 and the respective eight LN optical waveguides included in an LN optical waveguide 121 included in the LN modulating unit 120 and outputs the optical signal received from the Si optical waveguide to the LN optical waveguide.

The LN modulating unit 120 has the LN optical waveguide 121, a signal electrode 122, and a RF terminator 123. When light supplied from the first Si optical waveguide 111 is transmitted through the LN optical waveguide 121, the LN modulating unit 120 modulates the light by the electric field applied by the signal electrode 122. The LN optical waveguide 121 is an optical waveguide formed by using, for example, a thin film LN substrate and has eight LN optical waveguides that are disposed in parallel and that are joined to the respective first LN-Si waveguide joining unit 112 in the optical input unit 110. The light modulated by being transmitted through the LN optical waveguide 121 is output to the optical output unit 130.

The signal electrode 122 is a transmission path with a CPW structure provided at a position overlapping a positon of the LN optical waveguide 121 and applies an electric field to the LN optical waveguide 121 in accordance with the electrical signal with, for example, several tens of gigahertz (GHz) that is output from a Digital Signal Processor (DSP). The termination of the signal electrode 122 is connected to the RF terminator 123. The RF terminator 123 is connected to the termination of the signal electrode 122 and prevents unneeded reflection of a signal transmitted by the signal electrode 122.

The optical output unit 130 has a second LN-Si waveguide joining unit 131, a second Si optical waveguide 132, eight child-side Mach-Zehnder (MZ) sections 133, and four parent-side MZ sections 134. Furthermore, the optical output unit 130 has a polarization rotator (PR) 135 and a polarization beam combiner (PBC) 136. The second LN-Si waveguide joining unit 131 joins the eight LN optical waveguides 121 in the LN modulating unit 120 and the respective eight second Si optical waveguides 132. The second Si optical waveguide 132 has eight Si optical waveguides connected to the second LN-Si waveguide joining unit 131 and includes four Si optical waveguides that merge with the two Si optical waveguides out of the eight Si optical waveguides. Furthermore, the second Si optical waveguide 132 has the two Si optical waveguides that merge with the two Si optical waveguides out of the four Si optical waveguides and includes a single Si optical waveguide that merge with the two Si optical waveguides and that is connected to the optical fiber on the output side.

The eight Si optical waveguides included in the second Si optical waveguide 132 are provided with the child-side MZ sections 133 for each Si optical waveguide. By applying a bias voltage to a DC electrode on the Si optical waveguide, the set of the child-side MZ sections 133 adjust the bias voltage such that ON/OFF of the electrical signal is associated with the ON/OFF of the optical signal, and then, outputs an I signal or a Q signal. Each of the four Si optical waveguides included in the second Si optical waveguide 132 is provided with the parent-side MZ sections 134 for each Si optical waveguide. By applying a bias voltage to the DC electrode on the Si optical waveguide, a set of the parent-side MZ sections 134 adjusts the bias voltage such that ON/OFF of the electrical signal is associated with ON/OFF of the optical signal, and then, outputs a I signal or a Q signal.

The PR 135 rotates the I signal or the Q signal that is input from one of the set of the parent-side MZ sections 134 by 90 degrees and obtains a vertical polarization optical signal that is rotated by 90 degrees. Then, the PR 135 inputs the vertical polarization optical signal to the PBC 136. The PBC 136 multiplexes the vertical polarization optical signal that is input from the PR 135 and the horizontal polarization optical signal that is input from the other set of the parent-side MZ sections 134, and then, outputs a polarization division multiplexing signal.

The LN optical waveguide 121 is able to modulate light transmitted through the LN optical waveguide 121 by generating an electric field by applying a high-frequency signal to the signal electrode 122 and by changing the refractive index of the LN optical waveguide 121. Furthermore, the thin film LN substrate (not illustrated) and the LN optical waveguide 121 are layered on the buffer layer (not illustrated); therefore, it is possible to strongly confine light in the LN optical waveguide 121 and it is thus possible to decrease the drive voltage that is applied to the signal electrode 122.

Figure 8:
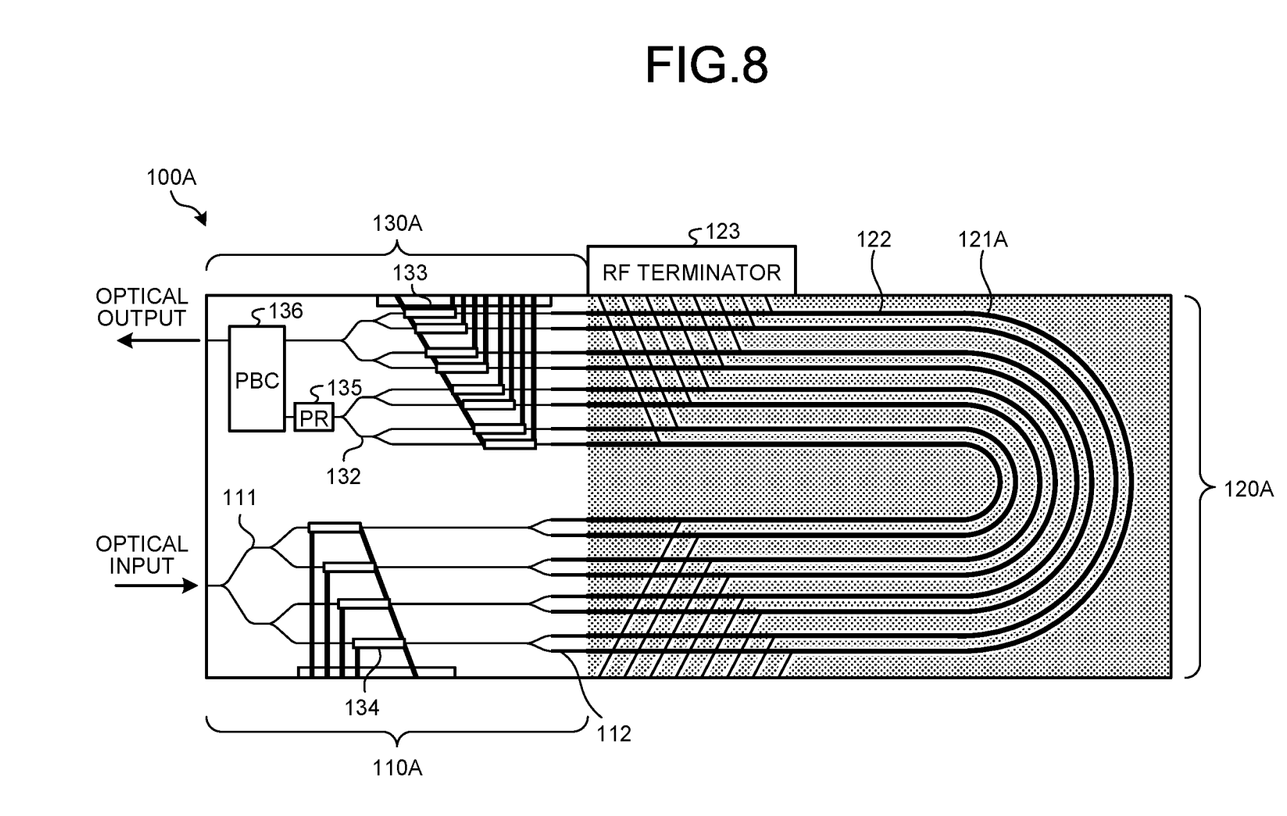
FIG. 8 is a schematic plan view illustrating an example of a configuration of an optical modulator that includes a LN optical waveguide having a U-shaped structure.

However, the length of the LN modulating unit 120 that includes the LN optical waveguide 121 is increased, so that the size of the optical modulator chip from the optical input unit 110 to the optical output unit 130 is increased. Therefore, the size of the chip is reduced by using a U-shaped structure for a LN optical waveguide 121A included in a LN modulating unit 120A, and an input end of an optical input unit 110A and an output end of an optical output unit 130A are arranged in parallel at one end of an optical modulator 100A. FIG. 8 is a schematic plan view illustrating an example of a configuration of the optical modulator 100A that includes a LN optical waveguide 121A having a U-shaped structure. Furthermore, by assigning the same reference numerals to components having the same configuration as those in the optical modulator 100 illustrated in FIG. 7, overlapping descriptions of the configuration and the operation thereof will be omitted.

The LN modulating unit 120A illustrated in FIG. 8 has a configuration in which a U-shaped structure is used for the LN optical waveguide 121A having a waveguide length that is longer than that of the LN modulating unit 120 illustrated in FIG. 7. Furthermore, the LN optical waveguide 121A has the U-shaped structure, so that an input end of the optical input unit 110A and an output end of the optical output unit 130A are arranged in parallel at one end of the optical modulator 100A. Consequently, even if the waveguide length of the LN optical waveguide 121A is lengthened, it is possible to prevent an increase in the size of the optical modulator chip by using the U-shaped structure.

Patent Document 1: Japanese Laid-open Patent Publication No. 2014-112171

Patent Document 2: Japanese Laid-open Patent Publication No. 2019-15791

In the optical modulator 100A illustrated in FIG. 8, a nested-type Mach-Zehnder interferometer is constructed by eight optical waveguides that connect the first Si optical waveguide 111, the LN optical waveguide 121A, and the second Si optical waveguide 132, and the waveguide lengths of the eight optical waveguides are different between the inner side and the outer side of the eight optical waveguides with the U-shaped structure. Furthermore, if the waveguide length of the optical waveguide that forms the Mach-Zehnder interferometer is increased, a bias point or a loss in the Mach-Zehnder interferometer greatly differs depending on the wavelength of an optical signal. Therefore, in order to cope with this state, the waveguide length is adjusted by providing a delay device in the LN optical waveguide on the inner side of the LN optical waveguide 121A with the U-shaped structure. However, an area for arranging the delay device is needed on the LN optical waveguide 121A, so that the size of the LN modulating unit 120A is increased. Consequently, the chip size of the optical modulator chip is increased.

SUMMARY

According to an aspect of an embodiment, an optical device includes an input unit that inputs an optical signal; a plurality of first silicon (Si) optical waveguides that split and output the optical signal received from the input unit; a plurality of LN (LiNbO$_3$) optical waveguides that are included in a LN modulating unit and that transmit the optical signals that are split and output by the first Si optical waveguides; a plurality of second Si optical waveguides that multiplex and output the associated optical signals that are output from the plurality of respective LN optical waveguides; an output unit that outputs the optical signal multiplexed by the second Si optical waveguides; and a plurality of Mach-Zehnder interferometers that are disposed on each of optical waveguides connected by the first Si optical waveguides, the LN optical waveguides, and the second Si optical waveguides, respectively. When there are differences among waveguide lengths of the LN optical waveguides, optical path lengths of the optical waveguides for the respective Mach-Zehnder interferometers are configured to be equalized.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Furthermore, the present invention is not limited to the embodiments.

[a] First Embodiment

Figure 1:
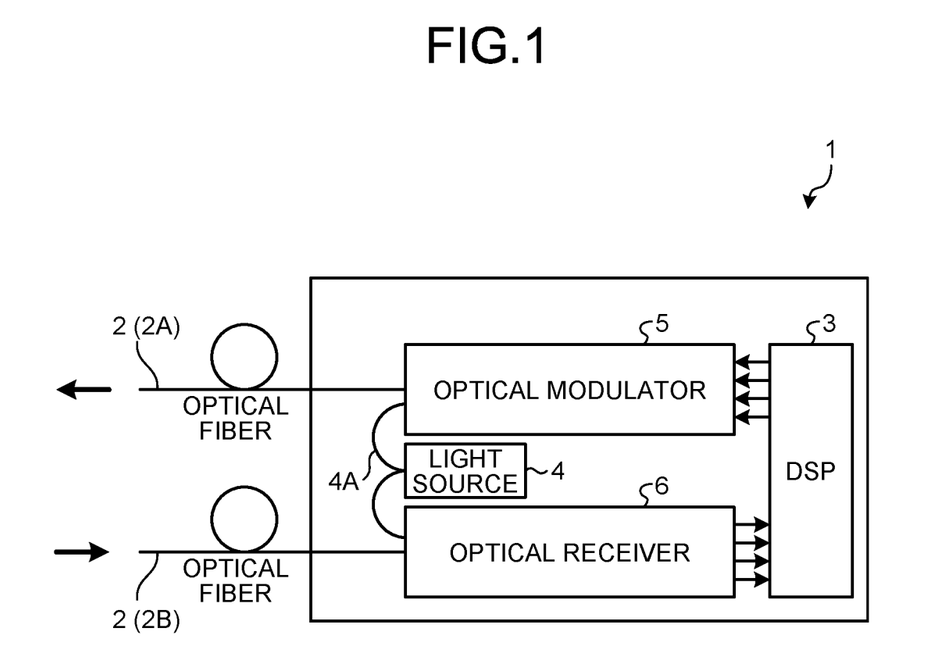
FIG. 1 is a block diagram illustrating an example of a configuration of an optical communication apparatus according to an embodiment.

FIG. 1 is a block diagram illustrating an example of a configuration of an optical communication apparatus 1 according to an embodiment. The optical communication apparatus 1 illustrated in FIG. 1 is connected to an optical fiber 2A (2) disposed on the output side and an optical fiber 2B (2) disposed on the input side. The optical communication apparatus 1 has a digital signal processor (DSP) 3, a light source 4, an optical modulator 5, and an optical receiver 6. The DSP 3 is an electrical component that performs digital signal processing. The DSP 3 performs a process of, for example, encoding transmission data or the like, generates an electrical signal including the transmission data, and outputs the generated electrical signal to the optical modulator 5. Furthermore, the DSP 3 acquires an electrical signal including reception data from the optical receiver 6 and performing a process of decoding the acquired electrical signal, so that the DSP 3 obtains the reception data.

The light source 4 includes, for example, a laser diode or the like, generates light with a predetermined wavelength, and supplies the generated light to the optical modulator 5 and the optical receiver 6. The optical modulator 5 is an optical device that modulates, by using an electrical signal that is output from the DSP 3, the light supplied from the light source 4 and that outputs the obtained optical transmission signal to the optical fiber 2A. The optical modulator 5 includes, for example, a LN optical waveguide 31 and a signal electrode 32 that has a micro strip line (MSL) structure. When the light supplied from the light source 4 is transmitted through the LN optical waveguide 31, the optical modulator 5 generates an optical transmission signal by modulating the light by the electrical signal that is input to the signal electrode 32.

The optical receiver 6 receives an optical signal from the optical fiber 2B and demodulates the received optical signal by using the light supplied from the light source 4. Then, the optical receiver 6 converts the demodulated received optical signal to an electrical signal, and then, outputs the converted electrical signal to the DSP 3.

Figure 2:
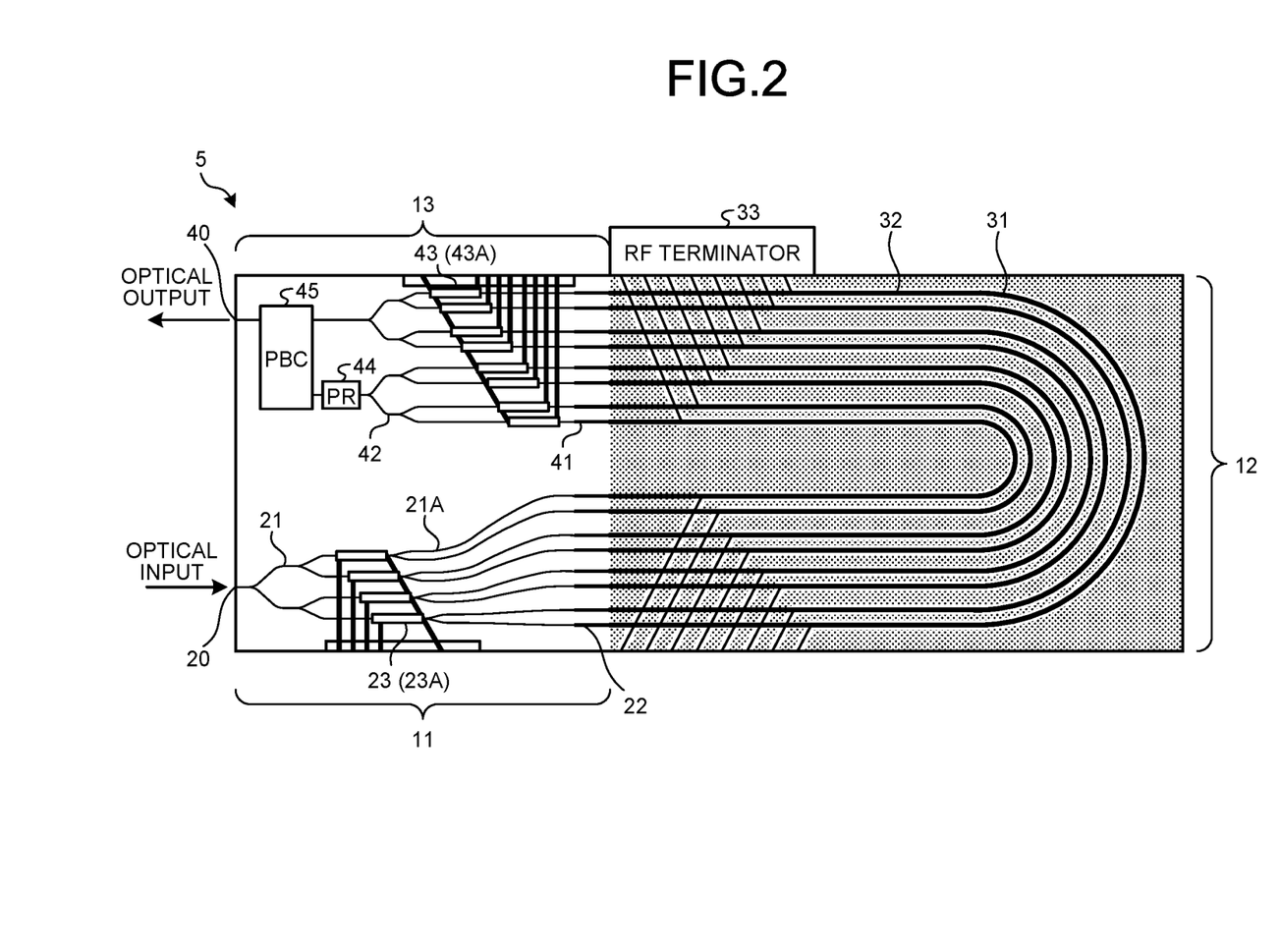
FIG. 2 is a schematic plan view illustrating a configuration of an optical modulator according to a first embodiment.

FIG. 2 is a schematic plan view illustrating an example of a configuration of the optical modulator 5 according to a first embodiment. The optical modulator 5 illustrated in FIG. 2 has a configuration in which an optical fiber 4A from the light source 4 is connected to an input side and the optical fiber 2A that is used to output a transmission signal is connected to the output side. The optical modulator 5 includes an optical input unit 11, a LN modulating unit 12, and an optical output unit 13. An input end of the optical input unit 11 and an output end of the optical output unit 13 are arranged in parallel at one end (on the left side in FIG. 2) of the optical modulator 5. The optical input unit 11 includes an input unit 20, a first Si optical waveguide 21, a first LN-Si waveguide joining unit 22, and a plurality of parent-side Mach-Zehnder (MZ) sections 23. The input unit 20 is connected to the optical fiber 4A on the input side. The first Si optical waveguide 21 includes a single Si optical waveguide that is connected to the input unit 20, two Si optical waveguides that branches off from the single Si optical waveguide, four Si optical waveguides that branches off from the associated two Si optical waveguides, and eight Si optical waveguides that branches off from the associated four Si optical waveguides. The parent-side MZ section 23 is arranged on each of the four Si optical waveguides included in the first Si optical waveguide 21. By applying a bias voltage of a DC electrode on the Si optical waveguide, a set of the parent-side MZ sections 23 adjusts the bias voltage such that ON/OFF of the electrical signal is associated with ON/OFF of the optical signal, and then, outputs an I signal or a Q signal. The first LN-Si waveguide joining unit 22 joins a portion between the eight Si optical waveguides included in the first Si optical waveguide 21 and the eight LN optical waveguides included in the LN optical waveguide 31 and outputs, to the LN optical waveguide, the optical signal received from the Si optical waveguide.

The LN modulating unit 12 includes the LN optical waveguide 31, the signal electrode 32, and a RF terminator 33. The LN optical waveguide 31 has a U-shaped structure in which the LN optical waveguide 31 is bent toward the optical output unit 13 from the optical input unit 11, so that the LN optical waveguide 31 has a waveguide length that is sufficient for appropriately changing the refractive index of the LN optical waveguide 31. Furthermore, the LN optical waveguide 31 has the U-shaped structure; therefore, the radius of curvature of an inner-side LN optical waveguide of the LN optical waveguide 31 is small and the radius of curvature of an outer-side LN optical waveguide of the LN optical waveguide 31 is large, and thus, the waveguide length of the inner-side LN optical waveguide is different from that of the outer-side LN optical waveguide.

When the optical signal supplied from the first Si optical waveguide 21 is transmitted through the LN optical waveguide 31, the LN modulating unit 12 modulates the subject optical signal by using an electric field applied from the signal electrode 32. The LN optical waveguide 31 is an optical waveguide that is formed by using, for example, a thin film LN substrate (not illustrated) and includes eight parallel LN optical waveguides. The light that is modulated at the time of being transmitted through the LN optical waveguide 31 is output to the optical output unit 13.

The signal electrode 32 is a transmission path that has the MSL structure and that is disposed at a position overlapping a position of the LN optical waveguide 31 and applies an electric field to the LN optical waveguide 31 in accordance with the electrical signal that is output from the DSP 3. The termination of the signal electrode 32 is connected to the RF terminator 33. The RF terminator 33 is connected to the termination of the signal electrode 32 and prevents unneeded reflection of a signal transmitted by the signal electrode 32.

The optical output unit 13 includes an output unit 40, a second LN-Si waveguide joining unit 41, a second Si optical waveguide 42, eight child-side MZ sections 43, a PR 44, and a PBC 45. The output unit 40 is connected to an optical fiber 4B. The second LN-Si waveguide joining unit 41 joins a portion between the LN optical waveguide 31 included in the LN modulating unit 12 and the second Si optical waveguide 42 and outputs the optical signal received from the LN optical waveguide 31 to the second Si optical waveguide 42. The second Si optical waveguide 42 includes eight Si optical waveguides connected to the second LN-Si waveguide joining unit 41 and also includes four Si optical waveguides that merge with the two Si optical waveguides out of the eight Si optical waveguides. Furthermore, the second Si optical waveguide 42 includes two Si optical waveguides, which merge with the two Si optical waveguides out of the four Si optical waveguides, and a single Si optical waveguide that merges with the two Si optical waveguides. The single Si optical waveguide is connected to the output unit 40. The eight Si optical waveguides included in the second Si optical waveguide 42 are provided with the child-side MZ sections 43 for each Si optical waveguide. By applying a bias voltage to the DC electrode on the Si optical waveguide, a set of the child-side MZ sections 43 adjusts the bias voltage such that ON/OFF of the electrical signal is associated with ON/OFF of the optical signal and outputs an I signal having an in-phase component or a Q signal having a quadrature component.

The PR 44 rotates the I signal or the Q signal that is input from one of two sets of the child-side MZ sections 43 by 90 degrees and obtains a vertical polarization optical signal that is rotated by 90 degrees. Then, the PR 44 inputs the vertical polarization optical signal to the PBC 45. The PBC 45 multiplexes the vertical polarization optical signal that is input from the PR 44 and the horizontal polarization optical signal that is input from the other two sets of the child-side MZ sections 43, and then, outputs a polarization division multiplexing signal.

The four parent-side MZ sections 23 disposed on the first Si optical waveguide 21, the eight child-side MZ sections 43 disposed on the second Si optical waveguide 42 constitute a nested-type Mach-Zehnder interferometer.

In the following, a configuration of the optical modulator 5 according to the first embodiment will be specifically described. The LN optical waveguide 31 included in the LN modulating unit 12 has a U-shaped structure, so that the waveguide lengths are different among the inner-side LN optical waveguides and the outer-side LN optical waveguides. Namely, there are differences among the waveguide lengths of the LN optical waveguides included in the LN optical waveguides 31. Thus, in the embodiment, in order to equalize the optical path lengths of the eight optical waveguides from the first Si optical waveguide 21 to the second Si optical waveguide 42 connected for each of the LN optical waveguides included the LN optical waveguide 31, the waveguide length of each of eight Si optical waveguides 21A included in the first Si optical waveguide 21 is adjusted. A single optical waveguide is an optical waveguide of the Mach-Zehnder interferometer extending from the first Si optical waveguide 21 to the second Si optical waveguide 42 via the first LN-Si waveguide joining unit 22, the LN optical waveguide 31, and the second LN-Si waveguide joining unit 41. Furthermore, the Si optical waveguide strongly confines light and can be bent to a small radius, so that it is possible to reduce an area needed for delay adjustment as compared with the LN optical waveguide 31. In order to equalize the optical path lengths of the optical waveguides, a curvature may also be adjusted in addition to adjusting the waveguide length of each of the Si optical waveguides 21A included in the first Si optical waveguide 21, and appropriate modifications are possible.

It is assumed that the effective refractive index inside the optical waveguides of the first Si optical waveguide 21 and the second Si optical waveguide 42 is denoted by N (Si) and the effective refractive index inside the optical waveguide of the LN optical waveguide 31 is denoted by N (LN). Furthermore, it is assumed that the waveguide length inside the optical waveguides of the first Si optical waveguide 21 and the second Si optical waveguide 42 is denoted by L (Si) and the waveguide length inside the optical waveguide of the LN optical waveguide 31 is denoted by L (LN). The optical path length of a single optical waveguide can be implemented by N(Si)×L(Si)+N(LN)×L(LN). Therefore, in order to equalize the optical path lengths of the eight optical waveguides by adjusting the optical path lengths inside the optical waveguides, the waveguide length of each of the Si optical waveguides 21A included in the first Si optical waveguide 21 is adjusted.

A high-frequency signal associated with the electrical signal that is output from the DSP 3 is transmitted by the signal electrode 32, so that an electric field is generated in a direction from the signal electrode 32 toward the ground electrode and the generated electric field is applied to the LN optical waveguide 31. Consequently, the refractive index of the LN optical waveguide 31 is changed in accordance with the electric field applied to the LN optical waveguide 31 and it is thus possible to modulate the light that is transmitted through the LN optical waveguide 31.

The optical modulator 5 according to the first embodiment is configured such that the optical path lengths of the optical waveguides for the respective Mach-Zehnder interferometers are equalized even if there are differences among the waveguide lengths of the LN optical waveguides included in the LN optical waveguide 31 by using, for example, the U-shaped structure for the LN optical waveguide 31. Consequently, even if there are differences among the waveguide lengths of the LN optical waveguides 31, it is possible to prevent an increase in the chip size of the optical modulator 5.

The first Si optical waveguide 21 included in the optical modulator 5 has the waveguide length that is equal to optical path length of the optical waveguide of each of the Mach-Zehnder interferometers by using the Si optical waveguides 21A included in the first Si optical waveguide 21. Consequently, even if there are differences among the waveguide lengths of the LN optical waveguides included in the LN optical waveguide 31, it is possible to prevent an increase in the chip size of the optical modulator 5. Furthermore, it is possible to prevent an increase in a module of the optical communication apparatus 1 that includes the built-in optical modulator 5.

The optical modulator 5 has a configuration in which the input unit 20 and the output unit 40 are arranged in parallel and the U-shaped structure is used for the LN optical waveguide 31 such that the LN optical waveguide 31 is bent toward the output unit 40 from the input unit 20 in order to generate differences among the waveguide lengths of the LN optical waveguides included in the LN optical waveguide 31; therefore, it is possible to prevent an increase in the chip size of the optical modulator 5.

Furthermore, for convenience of description, in the optical modulator 5 according to the first embodiment, a case has been described as an example in which the waveguide lengths inside the optical waveguides of the Si optical waveguides 21A included in the first Si optical waveguide 21 are adjusted so as to equalize the optical path length for each of the optical waveguides of the Mach-Zehnder interferometers. However, it may also be possible to adjust a curvature inside the optical waveguide of the optical waveguide of the first Si optical waveguide 21, and appropriate modifications are possible.

Figure 3:
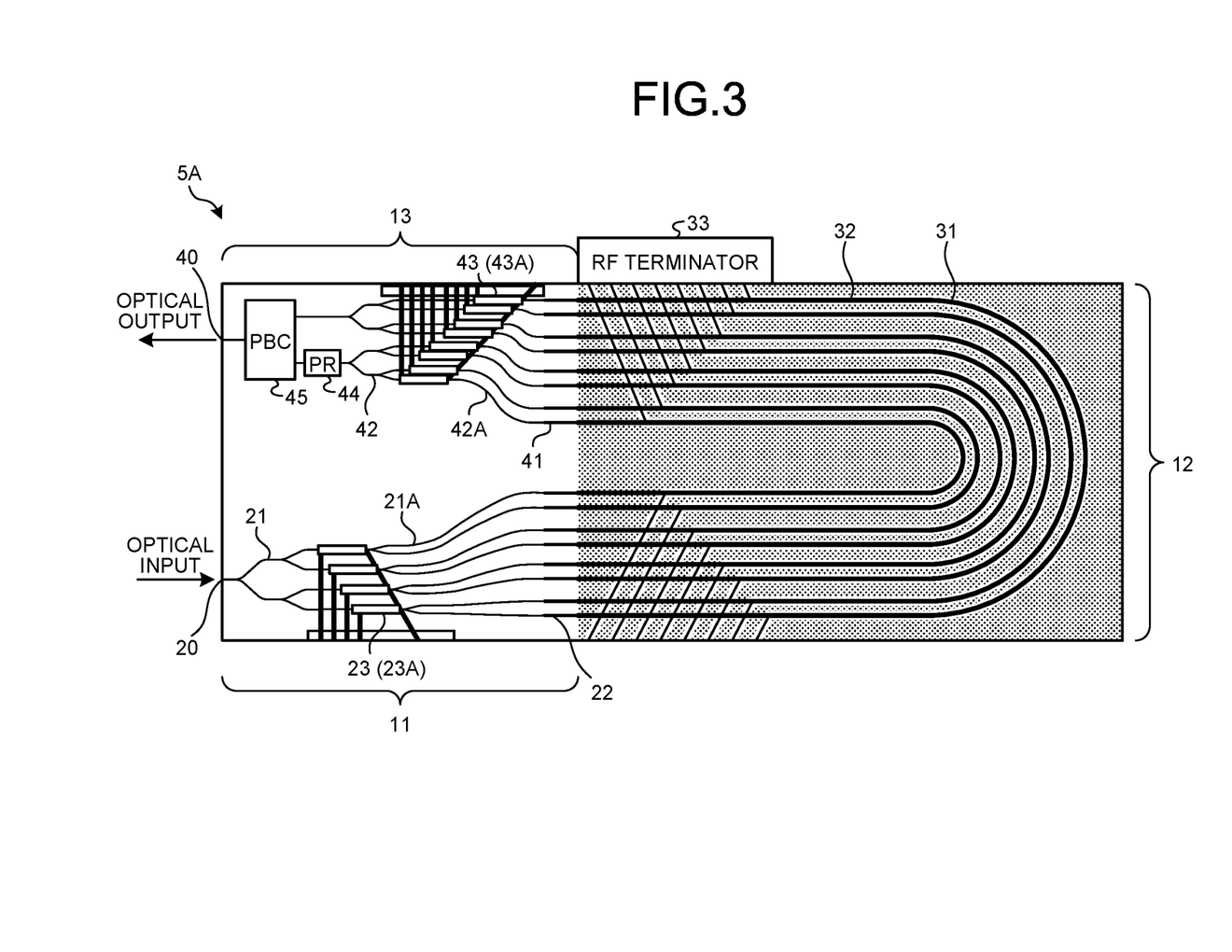
FIG. 3 is a schematic plan view illustrating an example of a configuration of an optical modulator according to a second embodiment.

Furthermore, a case has been described as an example of adjusting, in the optical modulator 5, the waveguide length inside the optical waveguide of the first Si optical waveguide 21 in order to equalize the optical path lengths of each of the optical waveguides of the Mach-Zehnder interferometers. However, instead of the first Si optical waveguide 21, it may also be possible to adjust the waveguide length of the inner side of the optical waveguide of the second Si optical waveguide 42. Furthermore, it may also be possible to adjust the waveguide length of the inner side of the optical waveguide of each of the first Si optical waveguide 21 and the second Si optical waveguide 42, and an embodiment thereof will be described as a second embodiment. FIG. 3 is a schematic plan view illustrating an example of a configuration of an optical modulator 5A according to the second embodiment. Furthermore, by assigning the same reference numerals to components having the same configuration as those in the optical modulator 5 according to the first embodiment, overlapping descriptions of the configuration and the operation thereof will be omitted.

[b] Second Embodiment

In the optical modulator 5A illustrated in FIG. 3, in order to equalize the optical path length of each of the optical waveguides of the Mach-Zehnder interferometers, the waveguide length of the inner side of the Si optical waveguides 21A included in the first Si optical waveguide 21 and an inner side of a Si optical waveguide 42A included in the second Si optical waveguide 42 for each optical waveguide are adjusted.

In the following, a configuration of the optical modulator 5A according to the second embodiment will be specifically described. The LN optical waveguide 31 included in the LN modulating unit 12 has the U-shaped structure, so that the waveguide length of the inner-side LN optical waveguide is different from the waveguide length of the outer-side LN optical waveguide. In the embodiment, the optical path lengths of the eight optical waveguides from the first Si optical waveguide 21 to the second Si optical waveguide 42 connected to each of the LN optical waveguides 31 are equalized. Then, in order to equalize the optical path lengths of the eight optical waveguides, the waveguide length of each of the eight Si optical waveguides 21A included in the first Si optical waveguide 21 and the waveguide length of each of the eight Si optical waveguides 42A included in the second Si optical waveguide 42 are adjusted. For example, the waveguide lengths of the Si optical waveguides 21A and 42A connected to the inner-side LN optical waveguides are lengthened and the waveguide lengths of the Si optical waveguides 21A and 42A connected to the outer-side LN optical waveguides are shortened in order to equalize the optical path lengths of the respective optical waveguides by an amount corresponding to N(Si)×L(Si)+N(LN)×L(LN).

Furthermore, in order to equalize the optical path lengths of the optical waveguides, it may also be possible to adjust a curvature in addition to adjusting the waveguide length of the inner side of each of the Si optical waveguides 21A included in the first Si optical waveguide 21 and the waveguide length of the inner side of each of the Si optical waveguides 42A included in the second Si optical waveguide 42, and appropriate modifications are possible.

The Si optical waveguides 21A included in the first Si optical waveguide 21 and the Si optical waveguides 42A included in the second Si optical waveguide 42 that are included in the optical modulator 5A according to the second embodiment have the waveguide lengths that are equal to the optical path lengths of the optical waveguides of the respective Mach-Zehnder interferometers. Consequently, even if there are differences among the waveguide lengths of the LN optical waveguides included in the LN optical waveguide 31, it is possible to prevent an increase in the chip size of the optical modulator 5A.

Figure 4:
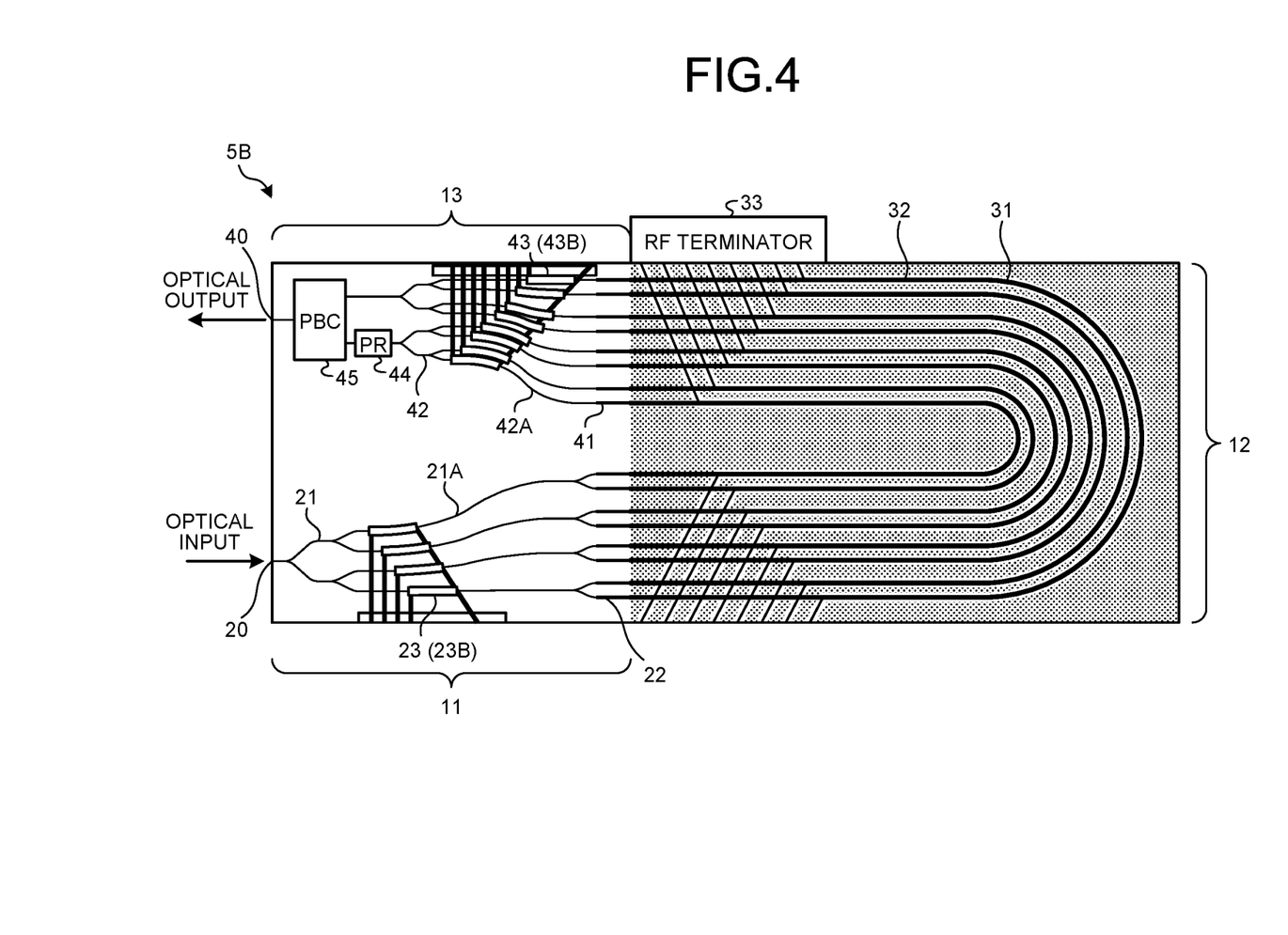
FIG. 4 is a schematic plan view illustrating an example of a configuration of an optical modulator according to a third embodiment.

Furthermore, a case has been described as an example in which the optical modulator 5 according to the first embodiment adjusts the waveguide lengths inside the optical waveguides included in the first Si optical waveguide 21 so as to equalize the optical path length of each of the optical waveguides of the Mach-Zehnder interferometers. However, it may also be possible to adjust DC electrodes 23A of the parent-side MZ sections 23 disposed on the first Si optical waveguide 21 and DC electrodes 43A of the child-side MZ sections 43 disposed on the second Si optical waveguide 42, and an embodiment thereof will be described as a third embodiment. FIG. 4 is a schematic plan view illustrating an example of a configuration of an optical modulator 5B according to the third embodiment. Furthermore, by assigning the same reference numerals to components having the same configuration as those in the optical modulator 5 according to the first embodiment, overlapping descriptions of the configuration and the operation thereof will be omitted.

[c] Third Embodiment

The optical modulator 5B illustrated in FIG. 4 adjusts, in order to equalize the optical path lengths of the optical waveguides of the Mach-Zehnder interferometers, the waveguide lengths of optical waveguides included in the first Si optical waveguide 21 and the second Si optical waveguide 42, and also, DC electrodes 23B and 43B of the parent-side MZ sections 23 and the child-side MZ sections 43 are adjusted. The optical modulator 5B adjusts, for example, the waveguide lengths of the inner side of the optical waveguides the Si optical waveguides 21A included in the first Si optical waveguide 21 and the waveguide length of the inner side of the Si optical waveguides 42A included in the second Si optical waveguide 42. Furthermore, the optical modulator 5B adjusts the DC electrodes 23B of the parent-side MZ sections 23 disposed on the first Si optical waveguide 21 and the DC electrodes 43B of the child-side MZ sections 43 disposed on the second Si optical waveguide 42.

In the following, a configuration of the optical modulator 5B according to the third embodiment will be specifically described. The LN optical waveguide 31 included in the LN modulating unit 12 has the U-shaped structure, so that the waveguide length of the inner-side LN optical waveguide is different from the waveguide length of the outer-side LN optical waveguide. Therefore, in the embodiment, the optical path lengths of the eight optical waveguides from the first Si optical waveguide 21 to the second Si optical waveguide 42 connected to each of the LN optical waveguides included in the LN optical waveguide 31 are equalized. Then, in order to equalize the optical path lengths of the eight optical waveguides, the waveguide length of each of the eight Si optical waveguides 21A included in the first Si optical waveguide 21 and the waveguide length of each of the eight Si optical waveguides 42A included in the second Si optical waveguide 42 are adjusted. Furthermore, the DC electrodes 23B of the parent-side MZ sections 23 disposed on the first Si optical waveguide 21 and the DC electrodes 43B of the child-side MZ sections 43 disposed on the second Si optical waveguide 42 are adjusted. Furthermore, adjustment of the DC electrodes 23B and 43B is adjustment of, for example, an electrode length (waveguide length) or a curvature of each of the DC electrodes 23B and 43B. The DC electrodes 23B and 43B is adjusted by, for example, lengthening the waveguide lengths of the Si optical waveguides 21A and 42A that are connected to the inner-side LN optical waveguides so as to equalize the optical path lengths of the respective optical waveguides by an amount corresponding to N(Si)×L(Si)+N(LN)×L(LN). Furthermore, the DC electrodes 23B and 43B are adjusted by, for example, shortening the waveguide lengths of the Si optical waveguides 21A and 42A connected to the outer-side LN optical waveguide so as to equalize the optical path lengths.

The optical modulator 5B according to the third embodiment has the configuration in which the Si optical waveguides 21A included in the first Si optical waveguide 21, the Si optical waveguides 42A included in the second Si optical waveguide 42, and the DC electrodes 23B and 43B of the parent-side MZ sections 23 and the child-sides MZ section 43, respectively, are adjusted so as to equalize the optical path lengths of the optical waveguides. The DC electrodes 23B of the parent-side MZ sections 23 or the DC electrodes 43B of the child-side MZ sections 43 have electrode lengths so as to equalize the optical path lengths of the optical waveguides. Consequently, even if there are differences among the waveguide lengths of the LN optical waveguides included in the LN optical waveguides 31, it is possible to prevent an increase in the chip size of the optical modulator 5A.

Furthermore, for convenience of description, a case has been described as an example in which the optical modulator 5B adjusts the Si optical waveguides 21A included in the first Si optical waveguide 21, the Si optical waveguides 42A included in the second Si optical waveguide 42, and the DC electrodes 23B and 43B of the parent-side MZ sections 23 and the child-side MZ sections 43, respectively, in order to equalize the optical path length of each of the optical waveguides. However, in order to equalize the optical path length of each of the optical waveguides, it may also be possible to adjust only the DC electrodes 23B and 43B of the parent-side MZ sections 23 and the child-side MZ sections 43, respectively, or, alternatively, it may also be possible to adjust one of the DC electrodes 23B and 43B of the parent-side MZ sections 23 and the child-side MZ sections 43, respectively, and appropriate modifications are possible.

Figure 5:
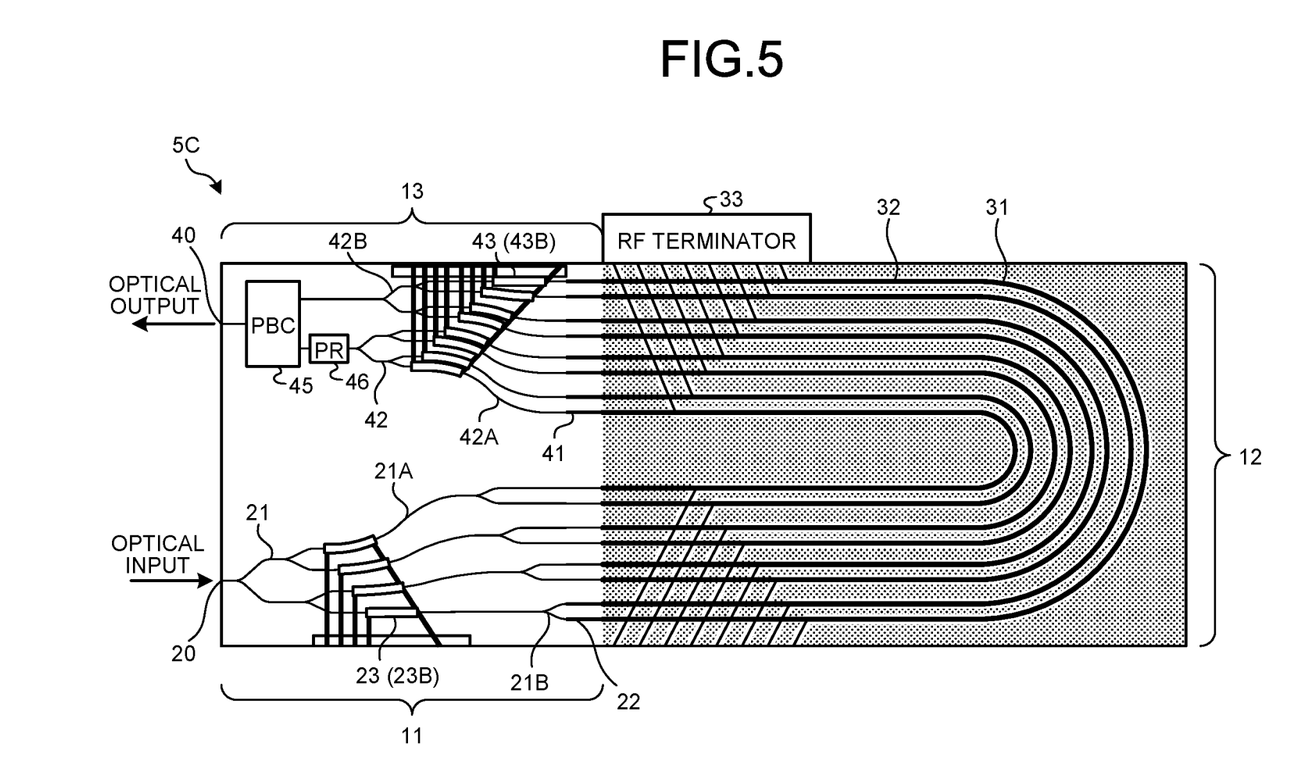
FIG. 5 is a schematic plan view illustrating an example of a configuration of an optical modulator according to a fourth embodiment.

A case has been described as an example in which the optical modulator 5 according to the first embodiment adjusts the waveguide lengths of inside the optical waveguides included in the first Si optical waveguide 21 so as to equalize the optical path lengths of the optical waveguides. However, it may also be possible to adjust the position of branch waveguides 21B disposed on the first Si optical waveguide 21, and an embodiment thereof will be described as a fourth embodiment. FIG. 5 is a schematic plan view illustrating a configuration of an optical modulator 5C according to the fourth embodiment. Furthermore, by assigning the same reference numerals to components having the same configuration as those in the optical modulator 5 according to the first embodiment, overlapping descriptions of the configuration and the operation thereof will be omitted.

[d] Fourth Embodiment

In the optical modulator 5C illustrated in FIG. 5 adjusts, in order to equalize the optical path lengths of the optical waveguides of the Mach-Zehnder interferometers, the waveguide length of the inner side of the Si optical waveguides 21A included in the first Si optical waveguide 21 and the waveguide length of the inner side of the Si optical waveguides 42A included in the second Si optical waveguide 42 for each of the optical waveguide. Furthermore, the optical modulator 5C adjusts the DC electrodes 23B of the parent-side MZ sections 23 disposed on the first Si optical waveguide 21 and the DC electrodes 43B of the child-side MZ sections 43 disposed on the second Si optical waveguide 42. Furthermore, the optical modulator 5C adjusts the positions of the branch waveguides 21B included in the first Si optical waveguide 21 by moving the branch waveguides 21B in the travelling direction of the optical signal. Furthermore, the optical modulator 5C adjusts the positions of multiplexing waveguides 42B included in the second Si optical waveguide 42 in the travelling direction of the optical signal.

In the following, a configuration of the optical modulator 5C according to the fourth embodiment will be specifically described. The LN optical waveguide 31 included in the LN modulating unit 12 has the U-shaped structure, so that the waveguide length of the inner-side LN optical waveguide is different from the waveguide length of the outer-side LN optical waveguide. Therefore, in the embodiment, the optical path lengths of the eight optical waveguides from the first Si optical waveguide 21 to the second Si optical waveguide 42 connected to the LN optical waveguides included in the LN optical waveguide 31 are equalized. Then, in order to equalize the optical path lengths of the eight optical waveguides, the waveguide length of each of the eight Si optical waveguides 21A included in the first Si optical waveguide 21 and the waveguide length of each of the eight Si optical waveguides 42A included in the second Si optical waveguide 42 are adjusted. Furthermore, in order to equalize the optical path lengths of the optical waveguides of the Mach-Zehnder interferometers, the DC electrodes 23B of the parent-side MZ sections 23 disposed on the first Si optical waveguide 21 and the DC electrodes 43B of the child-side MZ sections 43 disposed on the second Si optical waveguide 42 are adjusted. Furthermore, adjustment of the DC electrodes 23B and 43B is adjustment of, for example, an electrode length (waveguide length) or a curvature of the DC electrodes 23B and 43B.

Furthermore, from among the four Si optical waveguides included in the first Si optical waveguide 21, the positions of the branch waveguides 21B of the Si optical waveguides including the inner-side LN optical waveguides included in the LN optical waveguide 31 are adjusted by moving the branch waveguide 21B in the travelling direction of the optical signal. Namely, the waveguide length is shorter than that of the optical waveguide including the outer-side LN optical waveguide; therefore, the branch waveguides 21B on the Si optical waveguides are located at a position behind the travelling direction of the optical signal. Furthermore, the positions of the multiplexing waveguides 42B on the optical waveguides including the outer-side LN optical waveguides included in the LN optical waveguide 31 are adjusted by moving the multiplexing waveguides 42B from among the four Si optical waveguides included in the second Si optical waveguide 42 in the travelling direction of the optical signal. Namely, the waveguide length is longer than that of the optical waveguide including the inner-side LN optical waveguide; therefore, the multiplexing waveguides 42B of the Si optical waveguides are set to be located at a position behind the travelling direction of the optical signal.

The optical modulator 5C according to the fourth embodiment is configured to adjust the Si optical waveguides 21A included in the first Si optical waveguide 21, the Si optical waveguides 42A included in the second Si optical waveguide 42, and the DC electrodes 23B and 43B of the parent-side MZ section 23 and the child-side MZ section 43, respectively, so as to equalize the optical path lengths of the optical waveguides. The optical modulator 5C adjusts the positions of the branch waveguides 21B on the Si optical waveguides from among the four Si optical waveguides included in the first Si optical waveguide 21 and adjusts the positions of the multiplexing waveguides 42B on the Si optical waveguides from among the four Si optical waveguides included in the second Si optical waveguide 42 so as to equalize the optical path lengths of the optical waveguides. Namely, the first Si optical waveguide 21 has the waveguide length that is equal to the optical path length of the optical waveguide by disposing the positions of the branch waveguides 21B included in the first Si optical waveguide 21 in the travelling direction of the optical signal. The second Si optical waveguide 42 has the waveguide length that is equal to the optical path length of the optical waveguide by disposing the positions of the multiplexing waveguides 42B included in the second Si optical waveguide 42 in the direction opposite to the travelling direction of the optical signal. Consequently, even if there are differences among the waveguide lengths of the LN optical waveguides included in the LN optical waveguide 31, it is possible to prevent an increase in the chip size of the optical modulator 5C.

Furthermore, a case has been described as an example in which, in the optical modulator 5C according to the fourth embodiment, the positions of the inner side of the branch waveguides 21B disposed on the first Si optical waveguides 21 and the position of the inner side of the multiplexing waveguides 42B disposed on the second Si optical waveguides 42 are adjusted so as to equalize the optical path length for each of the optical waveguides. However, it may also be possible to adjust one of the positions of the inner side of the branch waveguides 21B on the first Si optical waveguides 21 and the positions of the inner side of the multiplexing waveguide 42B on the second Si optical waveguide 42 so as to equalize the optical path length for each of the optical waveguides, and appropriate modifications are possible.

Figure 6:
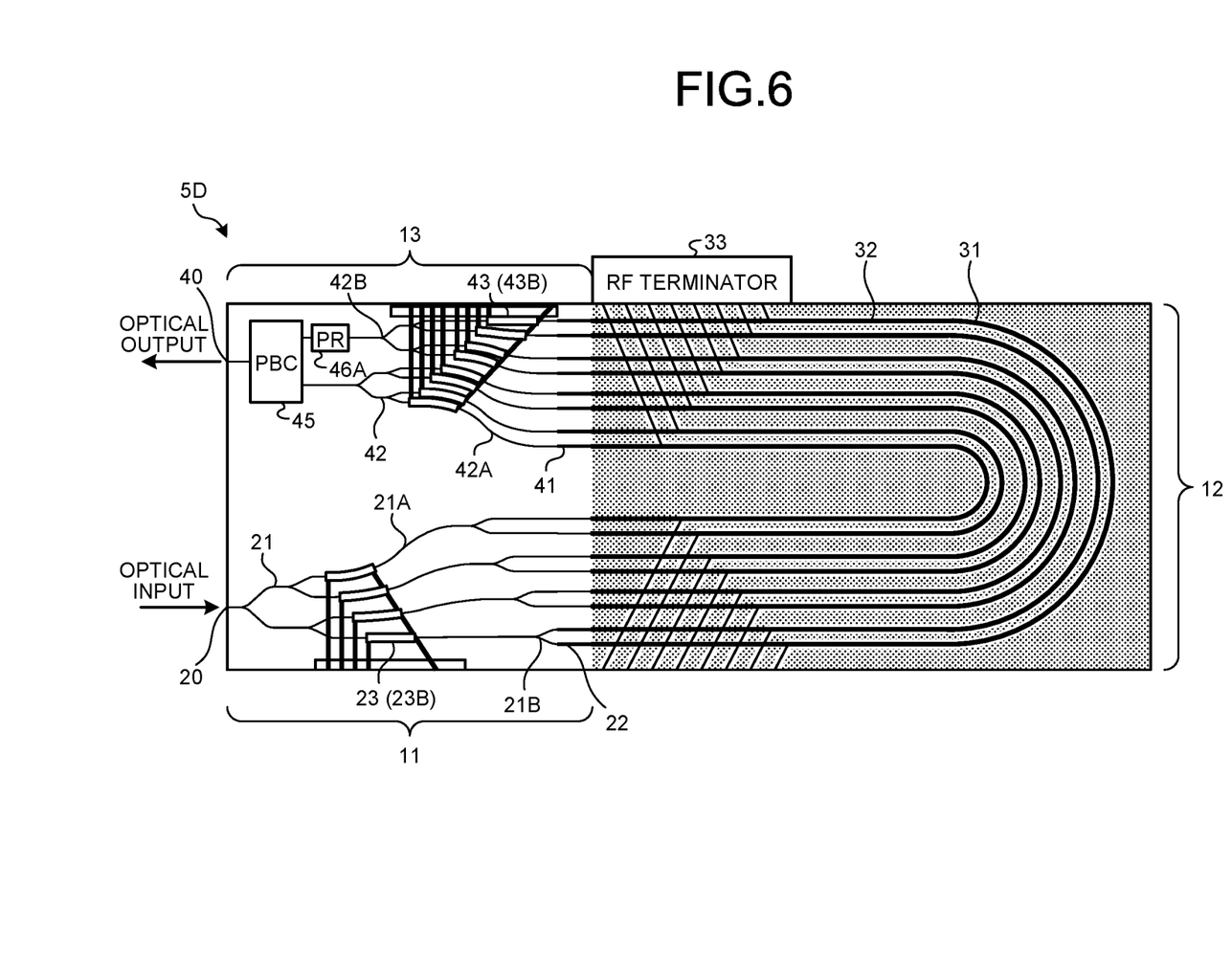
FIG. 6 is a schematic plan view illustrating an example of a configuration of an optical modulator according to a fifth embodiment.

For example, a loss in the LN optical waveguide 31 depends on the curvature of the bent waveguide having the U-shaped structure and a loss in the waveguide with a small radius of curvature is increased. In contrast, an excessive loss is generated in a PR 46 on the second Si optical waveguide 42. Accordingly, in order to cope with the circumstances, an embodiment in which, in the optical modulator 5C, the PR 46 is disposed on the optical waveguide including a LN optical waveguide having a large radius of curvature from among the eight LN optical waveguides 31 having the U-shaped structure will be described as a fifth embodiment. FIG. 6 is a schematic plan view illustrating an example of a configuration of an optical modulator 5D according to the fifth embodiment. Furthermore, by assigning the same reference numerals to components having the same configuration as those in the optical modulator 5C according to the fourth embodiment, overlapping descriptions of the configuration and the operation thereof will be omitted.

[e] Fifth Embodiment

The optical modulator 5D illustrated in FIG. 6 adjusts, in order to equalize the optical path lengths of each of the optical waveguides of the Mach-Zehnder interferometers, the waveguide lengths of the inner side of the Si optical waveguides 21A included in the first Si optical waveguide 21 and the waveguide lengths the inner side of the Si optical waveguides 42A included in the second Si optical waveguide 42 for each of the optical waveguides. Furthermore, the optical modulator 5D adjusts the DC electrodes 23B of the parent-side MZ sections 23 disposed on the first Si optical waveguide 21 and the DC electrodes 43B of the child-side MZ sections 43 disposed on the second Si optical waveguide 42. Furthermore, the optical modulator 5D adjusts the positions of the branch waveguides 21B included in the first Si optical waveguide 21 by moving the positions in the travelling direction of the optical signal. Furthermore, The optical modulator 5D adjusts the positions of the multiplexing waveguides 42B included in the second Si optical waveguide 42 by moving the positions in the travelling direction of the optical signal. Furthermore, the optical modulator 5D disposes a PR 46A on the optical waveguides including the LN optical waveguide having a larger radius of curvature, i.e., the LN optical waveguides disposed on the outer side, from among the eight LN optical waveguides 31 with the U-shaped structure.

In the following, a configuration of the optical modulator 5D according to the fifth embodiment will be specifically described. The LN optical waveguide 31 included in the LN modulating unit 12 has the U-shaped structure, so that the waveguide length of the inner-side LN optical waveguide is different from the waveguide length of the outer-side LN optical waveguide. Therefore, in the embodiment, the optical path lengths of the eight optical waveguides from the first Si optical waveguide 21 to the second Si optical waveguide 42 connected to the LN optical waveguides included in the LN optical waveguide 31 are equalized. Then, in order to equalize the optical path lengths of the eight optical waveguides, the waveguide length of each of the eight Si optical waveguides 21A included in the first Si optical waveguide 21 and the waveguide length of each of the eight Si optical waveguides 42A included in the second Si optical waveguide 42 are adjusted. Furthermore, in order to equalize the optical path lengths of each of the optical waveguides of the Mach-Zehnder interferometers, the DC electrodes 23B of the parent-side MZ sections 23 disposed on the first Si optical waveguides 21 and the DC electrodes 43B of the child-side MZ sections 43 disposed on the second Si optical waveguides 42 are adjusted. Furthermore, adjustment of the DC electrodes 23B and 43B is adjustment of, for example, the waveguide length or the curvature of each of the DC electrodes 23B and 43B.

Furthermore, from among the four Si optical waveguides included in the first Si optical waveguide 21, the positions of the branch waveguides 21B of the Si optical waveguides including the inner-side LN optical waveguides included in the LN optical waveguide 31 are adjusted by moving the positions in the travelling direction of the optical signal. Furthermore, from among the four Si optical waveguides included in the second Si optical waveguide 42, the positions of the multiplexing waveguides 42B of the optical waveguides including the outer-side LN optical waveguide included in the LN optical waveguide 31 are adjusted by moving the positions in the travelling direction of the optical signal.

Furthermore, the optical modulator 5D disposes the PR 46A on the optical waveguides including the LN optical waveguides that have a larger radius of curvature, i.e., that are disposed on the outer side, from among the eight LN optical waveguides 31 having the U-shaped structure. A loss in the optical waveguide including the LN optical waveguide that has a smaller radius of curvature, i.e., that is disposed on the inner side is increased, so that the PR 46 in which a loss is increased is not disposed. Consequently, from among the waveguides having the U-shaped structure included in the LN optical waveguide 31, a difference between a loss in the optical waveguide including the outer-side LN optical waveguide and a loss in the optical waveguide including the inner-side LN optical waveguide is set to be small. Consequently, it is possible to ensure a balance of the losses between the vertically polarized waves and the horizontally polarized waves.

The optical modulator 5D according to the fifth embodiment is configured to adjust the Si optical waveguides 21A included in the first Si optical waveguide 21, the Si optical waveguides 42A included in the second Si optical waveguide 42, and the DC electrodes 23B and 43B of the parent-side MZ sections 23 and the child-side MZ sections 43, respectively, so as to equalize the optical path lengths of the optical waveguides. The optical modulator 5D adjusts the positions of the multiplexing waveguides 42B disposed on the Si optical waveguides from among the four Si optical waveguides included in the second Si optical waveguide 42 and adjusts the positions of the branch waveguides 21B disposed on the Si optical waveguides from among the four Si optical waveguides included in the first Si optical waveguide 21 such that the optical path lengths of the optical waveguides are equalized. The optical modulator 5D disposes the PR 46A on the optical waveguides including the LN optical waveguides that have a larger radius of curvature, i.e., that are disposed on the outer side, from among the eight LN optical waveguides 31 having the U-shaped structure. Consequently, it is possible to reduce a loss between the optical waveguides caused by a loss due to disposition of the PR 46A. Furthermore, even if there are differences among the waveguide lengths of the LN optical waveguides included in the LN optical waveguide 31, it is possible to prevent an increase in the chip size of the optical modulator 5D.

Furthermore, for convenience of description, a case has been described as an example in which, in the optical modulator 5 according to the first embodiment, directional coupling is used for a portion between the first Si optical waveguide 21 and the LN optical waveguide 31; however, a portion between the first Si optical waveguide 21 and the LN optical waveguide may also be coupled using butt coupling, and appropriate modifications are possible.

According to an aspect of an embodiment of the optical device and the like disclosed in the present application, it is possible to prevent an increase in the chip size even if LN optical waveguides are used.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical device comprising:
   an input unit that inputs an optical signal;
   a plurality of first silicon (Si) optical waveguides that split and output the optical signal received from the input unit;
   a plurality of LN (LiNbO$_3$) optical waveguides that are included in a LN modulator and that transmit the optical signals that are split and output by the first Si optical waveguides;
   a plurality of second Si optical waveguides that multiplex and output optical signals that are output from the plurality of respective LN optical waveguides;
   an output unit that outputs the optical signal multiplexed by the second Si optical waveguides; and
   a plurality of Mach-Zehnder interferometers that are disposed on optical waveguides connected by the first Si optical waveguides, the LN optical waveguides, and the second Si optical waveguides, respectively, wherein
   when there are differences among waveguide lengths of the LN optical waveguides, optical waveguides for the respective Mach-Zehnder interferometers are configured so as to equalize optical path lengths by adjusting an effective refractive index and a waveguide length inside at least one of the optical waveguides.

2. The optical device according to claim 1, wherein the first Si optical waveguides or the second Si optical waveguides have waveguide lengths so as to equalize the optical path lengths of the optical waveguides.

3. The optical device according to claim 1, wherein the first Si optical waveguides or the second Si optical waveguides have curvatures so as to equalize the optical path lengths of the optical waveguides.

4. The optical device according to claim 1, wherein the LN optical waveguides are configured to have a U-shaped structure such that the input unit and the output unit are disposed in parallel, the LN optical waveguides are bent toward the output unit from the input unit, and differences are generated among the waveguide lengths of the LN optical waveguides.

5. The optical device according to claim 4, wherein a polarization rotator that performs polarization rotation on the optical signals transmitted through the optical waveguides is disposed on the Si optical waveguides connected to the LN optical waveguides having a larger radius of curvature from among the LN optical waveguides having the U-shaped structure.

6. The optical device according to claim 1, wherein each of the Mach-Zehnder interferometers includes
   a plurality of first Mach-Zehnder sections disposed on the respective first Si optical waveguides, and
   a plurality of second Mach-Zehnder sections disposed on the respective second Si optical waveguides, and
   direct-current electrodes of the first Mach-Zehnder sections or direct-current electrodes of the second Mach-Zehnder sections have electrode lengths so as to equalize the optical path lengths of the optical waveguides.

7. The optical device according to claim 1, wherein each of the Mach-Zehnder interferometers includes
   a plurality of first Mach-Zehnder sections disposed on the respective first Si optical waveguides, and
   a plurality of second Mach-Zehnder sections disposed on the respective second Si optical waveguides, and
   direct-current electrodes of the first Mach-Zehnder sections or direct-current electrodes of the second Mach-Zehnder sections have curvatures so as to equalize the optical path lengths of the optical waveguides.

8. The optical device according to claim 6, wherein the first Mach-Zehnder sections are nested-type parent-side Mach-Zehnder sections, whereas the second Mach-Zehnder sections are nested-type child-side Mach-Zehnder sections.

9. The optical device according to claim 6, wherein the first Mach-Zehnder sections are nested-type child-side Mach-Zehnder sections, whereas the second Mach-Zehnder sections are nested-type parent-side Mach-Zehnder sections.

10. The optical device according to claim 1, wherein the first Si optical waveguides have the waveguide lengths so as to equalize the optical path lengths of the optical waveguides by disposing positions of branch waveguides included in the first Si optical waveguides in a travelling direction of the optical signals.

11. The optical device according to claim 1, wherein the second Si optical waveguides have the waveguide lengths so as to equalize the optical path lengths of the optical waveguides by disposing positions of multiplexing waveguides included in the second Si optical waveguide in a direction opposite to a travelling direction of the optical signals.

12. An optical communication apparatus comprising:

a processor that executes signal processing on an electrical signal;

a light source that generates light; and an optical device that modulates, by using the electrical signal that is output from the processor, the light generated from the light source, wherein the optical device includes an input unit that inputs an optical signal, a plurality of first silicon (Si) optical waveguides that split and output the optical signal received from the input unit, a plurality of LN (LiNbO$_3$) optical waveguides that are included in a LN modulator and that transmit the optical signals that are split and output by the first Si optical waveguides, a plurality of second Si optical waveguides that multiplex and output optical signals that are output from the plurality of respective LN optical waveguides, an output unit that outputs the optical signal multiplexed by the second Si optical waveguides, and a plurality of Mach-Zehnder interferometers that are disposed on optical waveguides connected by the first Si optical waveguides, the LN optical waveguides, and the second Si optical waveguides, respectively, and when there are differences among waveguide lengths of the LN optical waveguides, optical waveguides for the respective Mach-Zehnder interferometers are configured so as to equalize optical path lengths by adjusting an effective refractive index and a waveguide length inside at least one of the optical waveguides.

* * * * *